(12) United States Patent
Ross et al.

(10) Patent No.: US 8,182,349 B2
(45) Date of Patent: May 22, 2012

(54) RING AND ROTOR COUPLING ASSEMBLY

(75) Inventors: Kevin C. Ross, Hemlock, MI (US);
Steve B. Al-Rawi, Irvine, CA (US);
Daniel J. Diffin, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 447 days.

(21) Appl. No.: 12/128,833

(22) Filed: May 29, 2008

(65) Prior Publication Data
US 2009/0294200 A1 Dec. 3, 2009

(51) Int. Cl.
*F16D 3/58* (2006.01)

(52) U.S. Cl. .............. 464/78; 464/92; 180/444

(58) Field of Classification Search ............ 464/78, 464/88, 162, 169, 80, 87, 92, 99; 180/444; 267/181; 403/223
See application file for complete search history.

(56) References Cited

U.S. PATENT DOCUMENTS

| | | | | | |
|---|---|---|---|---|---|
| 2,166,290 | A | * | 7/1939 | Geyer | 464/88 X |
| 3,150,506 | A | * | 9/1964 | Alcaro | 464/78 |
| 3,844,137 | A | * | 10/1974 | Zugel | 464/78 |
| 3,988,906 | A | * | 11/1976 | Smith | 464/88 |
| 4,747,802 | A | * | 5/1988 | Hille | 464/99 X |
| 6,229,233 | B1 | * | 5/2001 | Torii et al. | 464/169 X |
| 7,097,564 | B2 | * | 8/2006 | Berg | 464/78 |
| 2005/0072620 | A1 | * | 4/2005 | Joushita | 180/444 |

FOREIGN PATENT DOCUMENTS

| | | | | | |
|---|---|---|---|---|---|
| AT | 172245 | * | 8/1952 | | 464/99 |
| GB | 558691 | * | 1/1944 | | 464/99 |

* cited by examiner

*Primary Examiner* — Gregory Binda
(74) *Attorney, Agent, or Firm* — Cantor Colburn LLP

(57) ABSTRACT

A coupling assembly includes a first coupling end operably connectable to a first shaft and a second coupling end operably connectable to a second shaft. A coupling body of a plastic material is located between and operably connected to the first coupling end and to the second coupling end. The coupling body includes at least one spring segment allowing relative motion between the first coupling end and the second coupling end along a coupling assembly axis. Also disclosed is a vehicle steering system utilizing the coupling assembly.

15 Claims, 3 Drawing Sheets

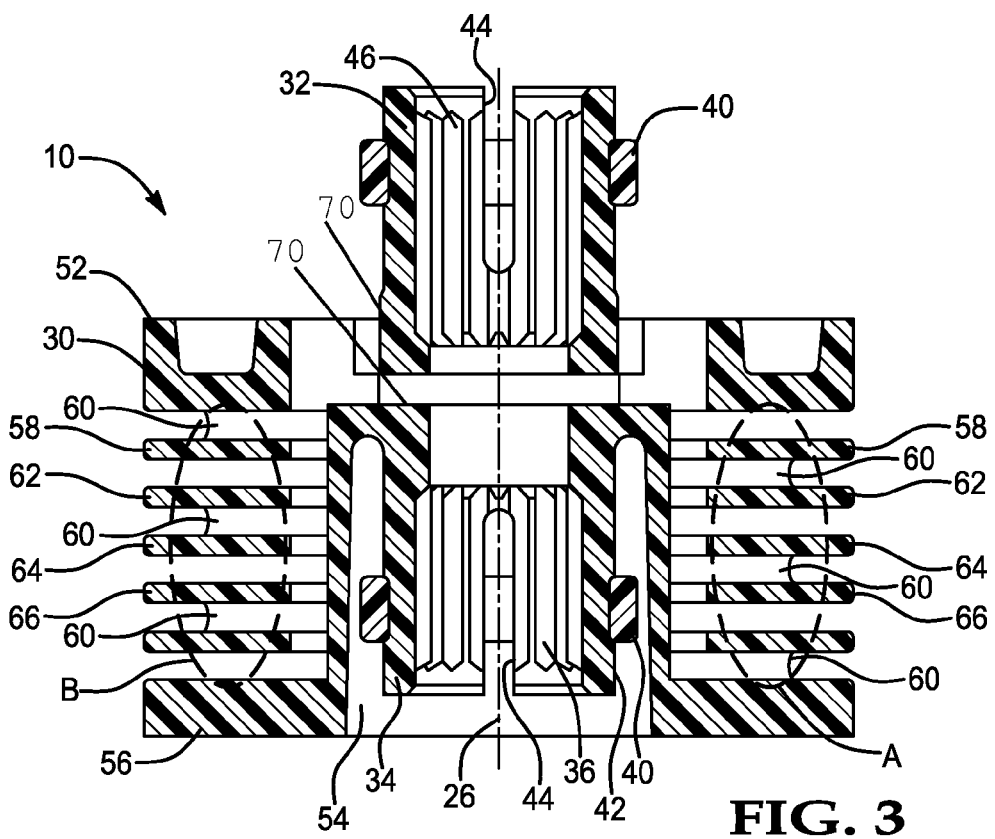
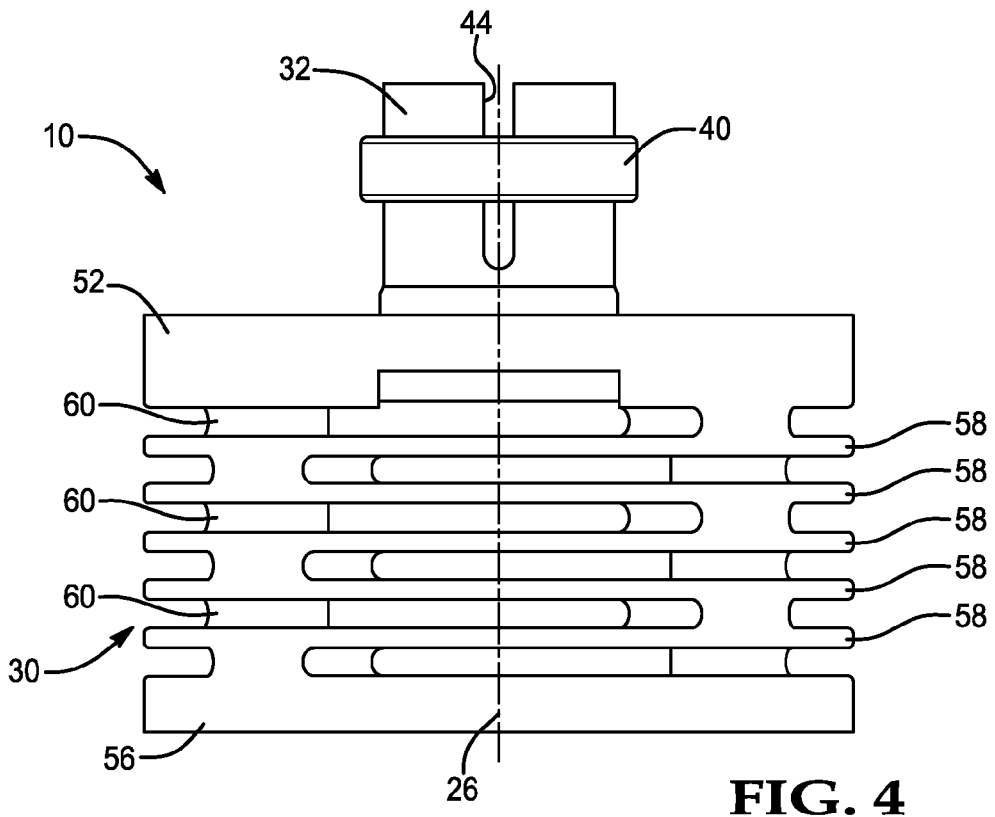

RING AND ROTOR COUPLING ASSEMBLY

TECHNICAL FIELD

The subject invention relates to couplings. More particularly, the subject invention relates to flexible couplings between two shafts.

BACKGROUND OF THE INVENTION

Couplings are utilized in systems, for example, vehicle steering systems to connect one shaft to another shaft. Vehicle steering systems typically include a driver interface, such as a steering wheel which is connected to one end of a steering column. When the driver rotates the steering wheel, the angular motion is transferred to the steering column which then rotates. Another end of the steering column is connected to the steered wheels of the vehicle through, for example, a rack and pinion gear. As the steering column rotates, the rack and pinion gear effects turning of the wheels to steer the vehicle in a desired direction.

Many steering systems include a steering assist mechanism which reduces an amount of force a driver must apply to rotate the steering wheel a desired amount. A typical mechanism includes a worm shaft which is coupled to a motor shaft of, for example, an electric motor, which drives the assist mechanism. The coupling must not only transfer torque from the motor shaft to the worm shaft, but also allow for stroke of the worm shaft along a central axis of the worm shaft.

SUMMARY OF THE INVENTION

A coupling assembly includes a first coupling end operably connectable to a first steering system shaft and a second coupling end operably connectable to a second steering system shaft. A coupling body formed from a plastic material is located between, and operably connected to, the first coupling end and to the second coupling end. The coupling body includes at least one spring segment allowing relative motion between the first coupling end and the second coupling end along a coupling assembly axis.

A vehicle steering system includes a first steering system shaft, a second steering system shaft, and a coupling assembly. The coupling assembly includes a first coupling end operably connectable to the first steering system shaft and a second coupling end operably connectable to the second steering system shaft. A coupling body is disposed between, and operably connected, to the first coupling end and to the second coupling end. The coupling body includes at least one spring segment allowing relative motion between the first coupling end and the second coupling end when one of the first steering system shaft and the second steering system shaft strokes along a coupling assembly axis.

BRIEF DESCRIPTION OF THE DRAWINGS

The present invention will now be described, by way of example, with reference to the accompanying drawings, in which:

FIG. 3 is a cross-sectional view of an embodiment of a coupling assembly of FIG. 2; and FIG. 4 is a plan view of the coupling assembly of FIG. 3.

DESCRIPTION OF THE PREFERRED EMBODIMENT

Figure 1:
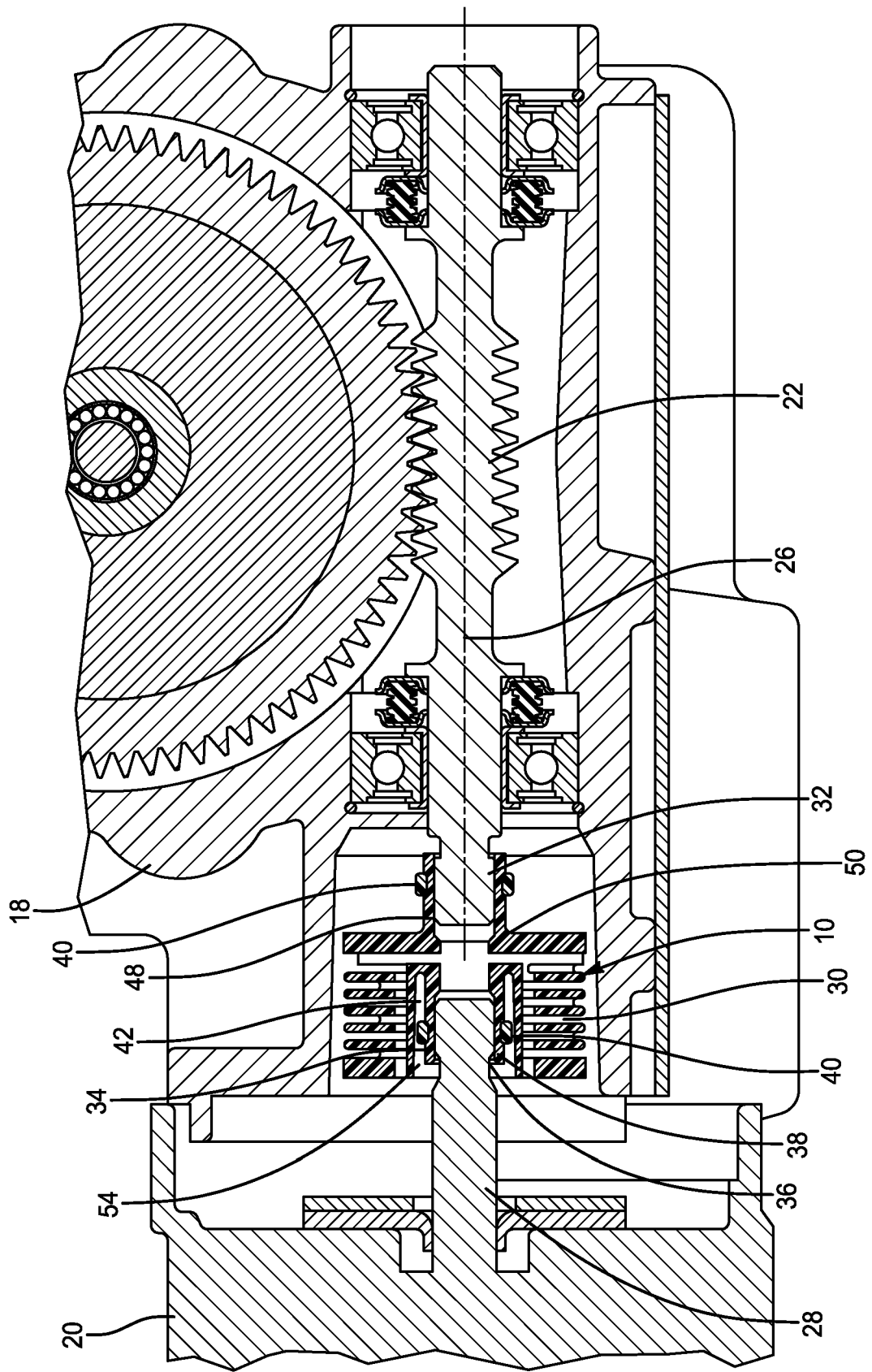
FIG. 1 is a cross-sectional view of an embodiment of a coupling between two portions of a vehicle steering system.
Figure 2:
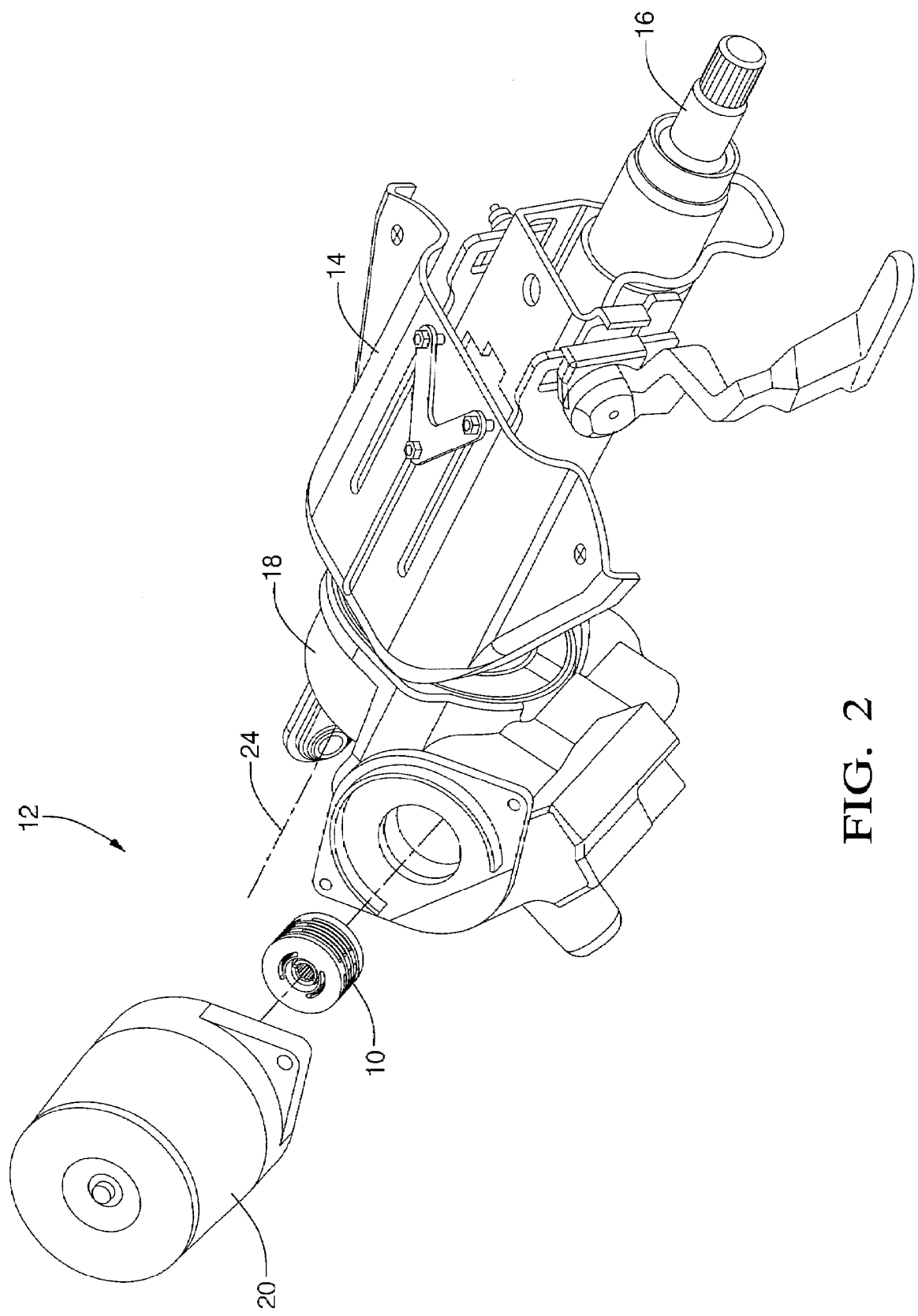
FIG. 2 is a partially exploded view of an embodiment of the vehicle steering system of FIG. 1.

Shown in FIG. 2 is a coupling 10. The coupling 10 is utilized, in for example, a steering system 12 shown in FIG. 2. A steering system 12 includes a steering column 14 connectable to a driver interface, for example, a steering wheel (not shown) at a steering wheel end 16. An assist mechanism 18 is disposed at the steering column 14 and is operably connected to the steering column 14. An assist motor 20 for driving the assist mechanism 18 is operably connected to the assist mechanism 18. As shown in FIG. 1, the assist mechanism 18 includes a worm shaft 22 extending transversely relative to a steering column axis 24 shown in FIG. 2. The worm shaft 22 rotates about a worm shaft axis 26 and strokes along the worm shaft axis 26 to apply torque to the steering column 14 thereby aiding in a rotation of the steering column 14 to a desired position. The assist motor 20, which in some embodiments is an electric motor, includes a motor shaft 28 which is driven by the assist motor 20. In some embodiments the motor shaft 28 extends from the assist motor 20 substantially along the worm shaft axis 26 toward the worm shaft 22.

In order for the assist motor 20 to drive the assist mechanism 18, the motor shaft 28 is coupled to the worm shaft 22 via the coupling assembly 10. In some embodiments, the coupling assembly 10 may be formed as a single unitary piece from, for example, a plastic material, and is formed by, for example, injection molding. Utilization of a plastic material for forming the coupling assembly 10 reduces weight of the coupling assembly 10, and results in a coupling assembly 10 which is both axially compliant and torsionally stiff. The coupling assembly 10 includes a coupling body 30, a worm side tube 32 receivable of a least a portion of the worm shaft 22, and a motor side tube 34 receivable of at least a portion of the motor shaft 28. In some embodiments, as shown in FIG. 3 the motor side tube 34 includes one or more motor tube splines 36 which are configured and disposed to engage one or more motor shaft splines 38 (shown in FIG. 1) of the motor shaft 28 when the motor shaft 28 is inserted into the motor side tube 34. The spline connection efficiently transfers torque from the motor shaft 28 into the coupling assembly 10. When the motor shaft 28 is inserted into the motor side tube 34, one or more clamp rings 40 may be installed at an outer diameter 42 of the motor side tube 34. The one or more clamp rings 40 apply a clamping load to the motor side tube 34 around the motor shaft 28 to better engage the motor tube splines 36 to the motor shaft splines 38 and to prevent the motor shaft 28 from being removed from the motor side tube 34. In some embodiments, the motor side tube 34 may include one or more tube slots 44 to increase flexibility of the motor side tube 34 so the motor side tube 34 is more easily clampable to the motor shaft 28.

Similarly, as shown in FIG. 3, the worm side tube 32 may include one or more internal worm tube splines 46 which are configured and disposed to engage with one or more worm shaft splines 48 of the worm shaft 22 shown in FIG. 1 to transfer torque from the coupling assembly 10 to the worm shaft 22. The motor side tube 34 includes a travel stop 70 at an end face of the motor side tube 34. The travel stop 70 reacts installation forces of the worm shaft 22 and/or the motor shaft 20 into the coupling 10 by limiting travel of the worm side tube 32 and the motor side tube 34 when inserting the respective worm shaft 22 and motor shaft 20. The travel stop 70 allows the shafts 20,22 to be installed into the coupling 10 while not transferring stresses to a plurality of connecting ribs 60 of the coupling 10, thereby preventing damage to the connecting ribs 60. When the worm shaft 22 is inserted into the worm side tube 32, one or more clamp rings 40 may be installed at an outer diameter 50 of the worm side tube 32. The one or more clamp rings 40 apply a clamping load to the worm side tube 32 around the worm shaft 22 to better engage the worm tube splines 46 to the worm shaft splines 48 and to prevent the worm shaft 22 from being removed from the worm side tube 32. In some embodiments, the worm side tube 32 may include one or more motor tube slots 44 to increase flexibility of the worm side tube 32 so the worm side tube 32 is more easily clampable to the worm shaft 22.

In the embodiment shown in FIG. 3, the worm side tube 32 is disposed such that it protrudes from a worm end 52 of the coupling body 30 and the motor side tube 34 is disposed in a coupling body recess 54 at a motor end 56 of the coupling body 30. It is to be appreciated, however, that alternative configurations of the worm side tube 32 and motor side tube 34 are contemplated within the present scope. For example, both the motor side tube 34 and the worm side tube 32 may protrude from the coupling body 30, or both may be disposed in coupling body recesses 54 depending on requirements and space limitations of particular vehicle steering systems 12.

Referring now to FIG. 4, the coupling body 30 includes one or more annularly shaped spring segments 58 arranged along the worm shaft axis 26 between the worm end 52 and the motor end 56. The embodiment illustrated in FIG. 4 includes five spring segments 58, but it is to be appreciated that other quantities of spring segments 58 may be utilized depending on the configuration and requirements of a particular vehicle steering system 12. To form the coupling body 30, adjacent spring segments 58 are connected to each other via one or more connector ribs 60. As best shown in FIG. 3, the connector ribs 60 are disposed to allow the worm end 52 to be moved closer to and farther away from the motor end 56 as the worm shaft 22 strokes along the worm shaft axis 26. For example, locations of connector ribs 60 may alternate throughout the coupling body 30. Connector ribs 60 between a first spring segment 58 and a second spring segment 62 are disposed in angular location "A", connector ribs 60 between the second spring segment 62 and a third spring segment 64 are disposed in angular location "B", and connector ribs 60 between the third spring segment 64 and a fourth spring segment 66 are again disposed in angular location "A". When the worm shaft 22 strokes toward the motor shaft 28, the fourth spring segment 66 is displaced toward the third spring segment 64 in angular location "B", the third spring segment 64 is displaced toward the second spring segment 62 in angular location "A", and the second spring segment 62 is displaced toward the first spring segment 58 in angular location "B". Similarly, the spring segments 58, 62, 64, 66 are displaced away from adjacent spring segments 58, 62, 64, 66 as the worm shaft 22 strokes away from the motor shaft 28.

The coupling assembly 10 described herein provides for the transfer of torque from the motor shaft 28 to the worm shaft 22 and maintains this ability while allowing for the stroke of the worm shaft 22 along the worm shaft axis 26 through elastic compressibility of the coupling assembly 10. Further, the flexibility of the coupling assembly 10 allows for and is able to overcome misalignment of the worm shaft 22 to the motor shaft 28 in the vehicle steering system 12 increasing ease of assembly of the vehicle steering system 12.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A single-piece unitary coupling assembly comprising:
a first coupling end operably connectable to a first shaft;
a second coupling end operably connectable to a second shaft;
a coupling body of a plastic material disposed between and operably connected to the first coupling end and to the second coupling end, the coupling body including at least two substantially annular spring segments, adjacent spring segments connected to each other via one or more axially-extending connecting ribs, the spring segments allowing relative motion between the first coupling end and the second coupling end along a coupling assembly axis; and
a travel stop disposed substantially at the coupling assembly axis configured to limit travel of the first coupling end and the second coupling end, wherein at least one of the first coupling end and the second coupling end is disposed in a coupling body recess.

2. The coupling assembly of claim 1 wherein the coupling assembly is formed by injection molding.

3. The coupling assembly of claim 1 wherein at least one of the first coupling end and the second coupling end includes at least one spline for operably connecting at least one of the first coupling end and the second coupling end to at least one of the first shaft and the second shaft.

4. The coupling assembly of claim 3 wherein the at least one spline is at least one internal spline.

5. The coupling assembly of claim 1 including at least one clamp ring for applying a clamp load to the first coupling end and/or the second coupling end.

6. The coupling assembly of claim 1 wherein at least one of the first coupling end and the second coupling end is a coupling tube extending from the coupling body.

7. The coupling assembly of claim 1 wherein the at least one spring segments are annular about the coupling assembly axis.

8. The coupling assembly of claim 1 wherein connecting ribs between sequential pairs of adjacent spring segments are disposed at substantially differing angular locations relative to the coupling assembly axis.

9. The coupling assembly of claim 1 wherein the at least one spring segment is five spring segments.

10. A vehicle steering system comprising:
a first steering system shaft;
a second steering system shaft; and
a single-piece unitary coupling assembly including:
a first coupling end operably connectable to the first steering system shaft;
a second coupling end operably connectable to the second steering system shaft;
a coupling body formed from a plastic material, disposed between and operably connected to the first coupling end and to the second coupling end, the coupling body including at least two substantially annular spring segments, adjacent spring segments connected to each other via one or more axially-extending connecting ribs, the spring segments allowing relative motion between the first coupling end and the second coupling end when one of the first steering system shaft and the second steering system shaft strokes along a coupling assembly axis; and a travel stop disposed substantially at the coupling assembly axis configured to limit travel of the first coupling end and the second coupling end, wherein at least one of the first coupling end and the second coupling end is disposed in a coupling body recess.

11. The vehicle steering system of claim 10 wherein the first steering assembly shaft is a worm shaft.

12. The vehicle steering system of claim 11 wherein the worm shaft strokes along the coupling assembly axis.

13. The vehicle steering system of claim 10 at least one of the first coupling end and the second coupling end includes at least one spline for operably connecting at least one of the first coupling end and the second coupling end to at least one of the first steering system shaft and the second steering system shaft.

14. The vehicle steering system of claim 10 including at least one clamp ring for applying a clamp load to the first coupling end and/or the second coupling end.

15. The vehicle steering system of claim 10 wherein connecting ribs between sequential pairs of adjacent spring segments are disposed at substantially differing angular locations relative to the coupling assembly axis.

* * * * *